S. MARDEN.
Peat Machine.
No. 53,538. Patented March 27, 1866.
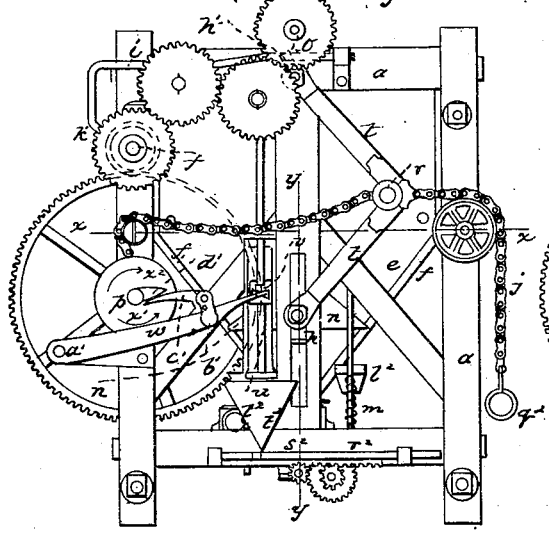
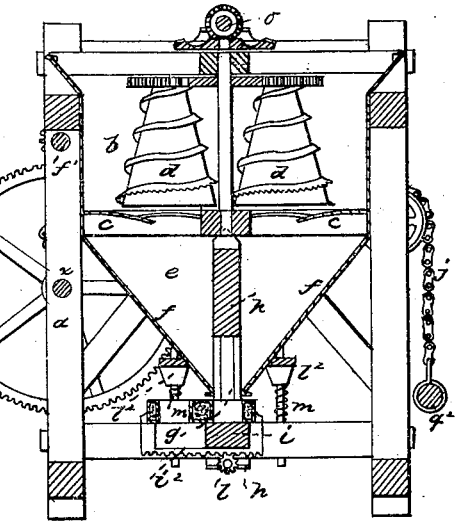
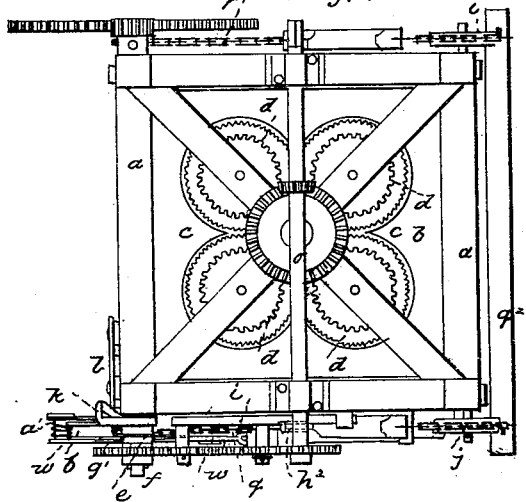
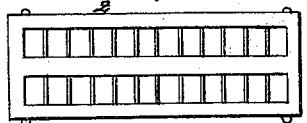
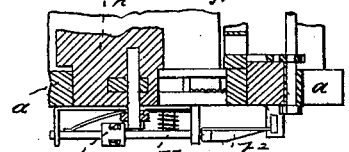
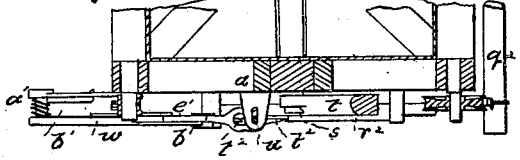

UNITED STATES PATENT OFFICE.

SAMUEL MARDEN, OF NEWTON, MASSACHUSETTS, ASSIGNOR TO HIMSELF, WM. H. ALLEN, A. P. TROTT, AND CYRUS COBB, JR.

IMPROVED MACHINE FOR PREPARING PEAT FOR FUEL.

Specification forming part of Letters Patent No. 53,538, dated March 27, 1866; antedated December 5, 1865.

*To all whom it may concern:*

Be it known that I, SAMUEL MARDEN, of Newton, in the county of Middlesex and State of Massachusetts, have invented an Improved Machine for Preparing Peat, &c.; and I do hereby declare that the following, taken in connection with the drawings which accompany and form part of this specification, is a description of my invention sufficient to enable those skilled in the art to practice it.

The invention relates to the construction, combination, and arrangement of mechanism for preparing peat for fuel.

The machine is applicable to the preparation of other semi-fluid material in which it is desirable, after trituration of the mass of material, to express the water from it and mold it into form for use. Thus it may be employed in the manufacture of bricks, stove-polish, &c.

The invention consists in the combination together of a rotary triturating mechanism, a reciprocating follower, and a mold-box; also, in combining with the molds and follower vertical plungers in such manner that at each descent of the follower to fill and compress the material into one series of molds one of the series of plungers simultaneously descends and clears the molds previously filled; also, in the mechanism by which the mold-box or frame is driven laterally to carry one set of molds out of and the other set into vertical line with the follower; also, in the mechanism by which the follower is operated.

The drawings represent a machine embodying the invention, Figure 1 showing a plan, Fig. 2 an end elevation, and Fig. 3 a vertical central cross-section, of the same. Fig. 4 is a horizontal section on the line $x\ x$, and Fig. 5 a vertical section on the line $y\ y$. Fig. 6 is a plan of the mold-box or frame.

$a$ denotes the frame of the machine, having built within it a chamber or box, $b$, for the reception of the peat as it is taken from the bog. The peat rests upon a floor or partition, $c$, and against the sides of a series of rotary conical drums, $d$, which carry helical triturating knives or blades, which, as they rotate, cut the fibers in the peat, and by their helical or screw form carry the material as it comes under the blades down into a conductor, $e$, which has inclined sides $f$ leading down to the outlet $g$, under which the mold-box $z$ works. A plunger or follower, $h$, works vertically through the center of this conductor, the semi-fluid or triturated peat, as it falls from the chamber $b$ into the conductor and down the sides thereof toward the outlet $g$, coming directly under the bottom face of the follower, so that each time the follower descends it shall drive the material into the molds beneath and compress it into the same, so as to remove the water from the peat and mold it into compact forms for subsequent drying and use.

The mold-box $z$ is composed of a series of molds or compartments of the shape desired for the peat, which, when the molds are beneath the follower, rest upon a bed-piece, $i$, which thus forms the bottom of the molds. The frame of the molds is made hollow, the sides against the molds being perforated, as seen in Fig. 3. The hollow space in the box is filled with sponge or other similar material, into which the water from the peat is easily driven by pressure of the follower, while at the same time the sponge so fills the perforations in the box as to prevent the peat from being driven through them.

The frame is made with two series of molds, as seen in Figs. 3 and 6, and the box rests at each end and traverses upon the lower cross-beams of the frame $a$. A rack, $i^2$, is fixed to each end of the box, this rack engaging with the teeth of a gear, $k$, on a shaft, $l$, by which lateral motion is imparted to the mold-boxes at the proper times. When one series of molds is beneath the follower the other, with its charge, is beneath a clearer, $l^2$, there being two of them, one for each series of molds, as seen in Fig. 3. These clearers rest on springs $m$, and are driven down into and through the molds, and so as to press the peat from them by projections $n$ at each end of the follower, the springs serving to carry them back into position as the follower rises.

The triturating-cones are simultaneously rotated by a train of gearing, which connects them with the driving-shaft $o$, as will be readily understood by Fig. 1. The shaft $o$ is also geared (through a train of gears) to a shaft, $p$, at each end of which is a pulley, upon which winds a chain, $q$, which is connected to the joint $r$ of a pair of toggle-levers, $t$, the upper one of each pair being jointed to the top of the frame $a$, while the lower one is jointed to the follower $h$. Another chain, $j$, extends from the opposite side of each toggle, and, passing over a guide-pulley or sheave, has a weight or weighted bar, $q^2$, hung upon it, as seen in Figs. 2 and 3. The ends of the follower extend through slots to guide the follower vertically.

The lateral movement of the mold-box is effected as follows: A sliding rack-bar, $r^2$, connected to the shaft $l$ by suitable gearing, has a long slot, $s^2$, against the opposite ends of which two inclines, $t^2$, on the end of a vertical rod, $u$, work. The rod $u$ carries a sleeve, $v$, into the sides of which a fork on the end of a lever, $w$, extends. The lever is hung at its outer end on a fulcrum-pin, $a'$, and is borne upward by a spring, $b'$. The lever has an arm, $c'$, jointed loosely to it in such manner that pressure downward upon the arm depresses the lever, and through it the rod $u$ and inclines $t^2$, while pressure upward upon the outer end of the arm imparts no motion to the lever. The end of the pulley-shaft $p$ adjacent to the lever $w$ carries a wiper, $d'$, as seen in Fig. 2.

The operation of the mechanism is as follows: As the pulley-shaft is rotated in the direction of the arrow $x'$, (seen in Fig. 2,) the parts being in position as seen in the drawings, the winding of the chain upon the pulleys brings the toggle-arms into line and depresses the follower, filling the molds beneath, compressing the material therein, and pressing the water from the same, one of the clearers being at the same time depressed and discharging the pressed peat from the previously-filled molds. The driving-shaft communicates motion to the triturating mechanism simultaneously with the movement imparted to the pulley-shaft, to bring the peat into a homogeneous condition and feed it down into the chamber or conductor below. As the follower reaches the upper surface of the mold-box a clutch, $e'$, on the shaft $f'$ is thrown out of connection with a clutch upon the inner face of the gear $g'$. This is effected by a projection, $h'$, on the upper end of the upper toggle-arm upon a slide-rod, $i'$, which carries on its outer end an incline, $k'$, which, by the endwise movement of the rod, actuates a slide, $l'$, which, by its movement, carries the clutch $e'$ into or out of engagement with the clutch on the gear $g'$. As the gear-clutch is thrown out of connection with the clutch on the shaft the weight or weights $q^2$ on the ends of the chains $j$ draws the toggle-arms outward, carrying the follower up to its normal position and allowing the clearers to be raised by their springs. This movement of the toggles moves the rod $i'$ and slide $l'$, clutching the gear $g'$ and shaft $f'$ together. The movement of the driving-shaft is then reversed, driving the pulley-shaft in the direction denoted by the arrow $x^2$, causing the wiper $d'$ to depress the lever $w$ and forcing the rod $u$ down, causing one of the inclines $t^2$ to operate upon the rack-bar, carrying the charged molds out from beneath the follower and the empty molds beneath the same. The reversed movement of the triturators causes the sticks and foreign matter in the box $b$ to be raised by the movement of the screw-blades upon the triturating-cones, by which movement such matter is thrown from the machine or brought into position to be readily removed therefrom. After the lateral movement of the mold-box is effected the movement of the mechanism is again reversed, the rod $u$ is carried up by the spring $b'$, (the wiper elevating the arm $c'$ without imparting movement to the lever $w$,) the chains are again wound upon their pulleys, and the toggle-arms again operated to depress the follower, as before. The next movement of the rod $u$ causes the rack-bar to traverse in the opposite direction to its last movement, to bring the charged and empty molds into position, as will be readily understood.

I do not herein claim the construction of the mold-box, such construction forming the subject of a separate application made or to be made by me for a patent.

I claim—

1. The combination of the triturating mechanism, the follower, and the molds, when arranged to operate substantially as described.

2. The employment of the clearers, in combination with the follower and double set of mold-boxes, substantially as shown and described.

3. The arrangement or combination of mechanism for actuating the follower and clearers, substantially as shown.

4. The mechanism for imparting the reciprocating lateral movements to the mold-box, substantially as set forth.

SAML. MARDEN.

Witnesses:
F. GOULD,
W. B. GLEASON.